US008730218B2

(12) United States Patent
Wilson

(10) Patent No.: US 8,730,218 B2
(45) Date of Patent: May 20, 2014

(54) AMBIENT LIGHT-COMPENSATED REFLECTIVE DISPLAY DEVICES AND METHODS RELATED THERETO

(75) Inventor: Kelce Steven Wilson, Murphy, TX (US)

(73) Assignee: BlackBerry Limited (CA)

( * ) Notice: Subject to any disclaimer, the term of this patent is extended or adjusted under 35 U.S.C. 154(b) by 1134 days.

(21) Appl. No.: 12/704,701

(22) Filed: Feb. 12, 2010

(65) Prior Publication Data

US 2011/0199350 A1 Aug. 18, 2011

(51) Int. Cl.
*G06F 3/038* (2013.01)
*G09G 5/00* (2006.01)

(52) U.S. Cl.
USPC ............................................ 345/207; 305/87

(58) Field of Classification Search
USPC ................ 345/87, 207, 204; 349/61; 362/561
See application file for complete search history.

(56) References Cited

U.S. PATENT DOCUMENTS

| | | | |
|---|---|---|---|
| 4,443,065 | A | 4/1984 | Funada et al. |
| 7,221,374 | B2 | 5/2007 | Dixon |
| 7,423,705 | B2 | 9/2008 | Len-Li et al. |
| 7,489,428 | B2 | 2/2009 | Sampsell et al. |
| 7,538,889 | B2 | 5/2009 | Van Brocklin et al. |
| 7,595,811 | B2 | 9/2009 | Matsuda |
| 7,642,110 | B2 | 1/2010 | Miles |
| 7,643,199 | B2 | 1/2010 | Lan |
| 7,643,202 | B2 | 1/2010 | Sasagawa |
| 7,643,203 | B2 | 1/2010 | Gousev et al. |
| 7,646,529 | B2 | 1/2010 | Chui |
| 2002/0101769 | A1 | 8/2002 | Garverick et al. |
| 2004/0189610 | A1 | 9/2004 | Friend |
| 2006/0056178 | A1 | 3/2006 | Len-Li et al. |
| 2006/0132424 | A1 | 6/2006 | Ken et al. |
| 2006/0221020 | A1 | 10/2006 | Winer et al. |
| 2008/0303918 | A1 | 12/2008 | Douglas |
| 2009/0033676 | A1 | 2/2009 | Cybart et al. |
| 2009/0224678 | A1 | 9/2009 | Wang |
| 2010/0002090 | A1 | 1/2010 | Hung et al. |
| 2010/0014134 | A1 | 1/2010 | Cable |

FOREIGN PATENT DOCUMENTS

| | | |
|---|---|---|
| CA | 2731595 | 8/2011 |

OTHER PUBLICATIONS

"European Application Serial No. 10153524.3, Office Action mailed, Mar. 31, 2010", 10 pgs.
Johnson, R. Colin, "Qualcomm's Mirasol MEMS Display Reflects Iridescent Colors", http://www.smartertechnology.com/c/a/Technology-For-Chanqe/Qualcomms-Mirasol-MEMS-Display-Reflects-Iridescent-Colors/, (Dec. 3, 2009), 1 page.
Londergan, Ana, et al., "Advanced Processes for MEMS-based Displays", *Proceedings of the Asia Display 2007, SID*, vol. 1, pp. 107-112, (2007), 4 pages.
"European Application Serial No. 10153524.3, Office Action mailed Jan. 28, 2013", 11 pgs.

(Continued)

*Primary Examiner* — Ricardo L Osorio
(74) *Attorney, Agent, or Firm* — Schwegman Lundberg & Woessner, P.A.

(57) ABSTRACT

Various embodiments include devices, methods, data structures, and software that allow a reflective display device to, among other things, determine color components of a first image, detect an ambient light color composition, and weight one or more of the color components of the first image to provide a compensated image for display on the reflective display device. In one embodiment, the weighting compensates for a difference between the detected ambient light color composition and a specified color balance.

25 Claims, 7 Drawing Sheets

(56) References Cited

OTHER PUBLICATIONS

"European Application Serial No. 10153524.3, Office Action mailed Aug. 22, 2012", 9 pgs.
"European Application Serial No. 10153524.3, Response filed May 24, 2010 to Search Report mailed Mar. 31, 2010", 11 pgs.
"European Application Serial No. 10153524.3, Response filed Dec. 27, 2012 to Office Action mailed Aug. 22, 2012", 7 pgs.
"Canadian Application Serial No. 2,731,595, Office Action mailed Mar. 4, 2013", 5 pgs.
Canadian Application Serial No. 2,731,595, Office Action mailed Jan. 28, 2014, 6 pgs.
European Application Serial No. 10153524.3, Result of consultation mailed Nov. 15, 2013, 16 pgs.

AMBIENT LIGHT-COMPENSATED REFLECTIVE DISPLAY DEVICES AND METHODS RELATED THERETO

BACKGROUND

Mobile devices are becoming more complex, and are consuming increasingly greater amounts of power for operation. In particular, display elements in mobile devices can demand a large percentage of the available power. When using a battery-operated mobile device, the total available energy is limited, and such greater power demands can more quickly deplete the battery, such as compared to a mobile device consuming less power.

DETAILED DESCRIPTION

Figure 1:
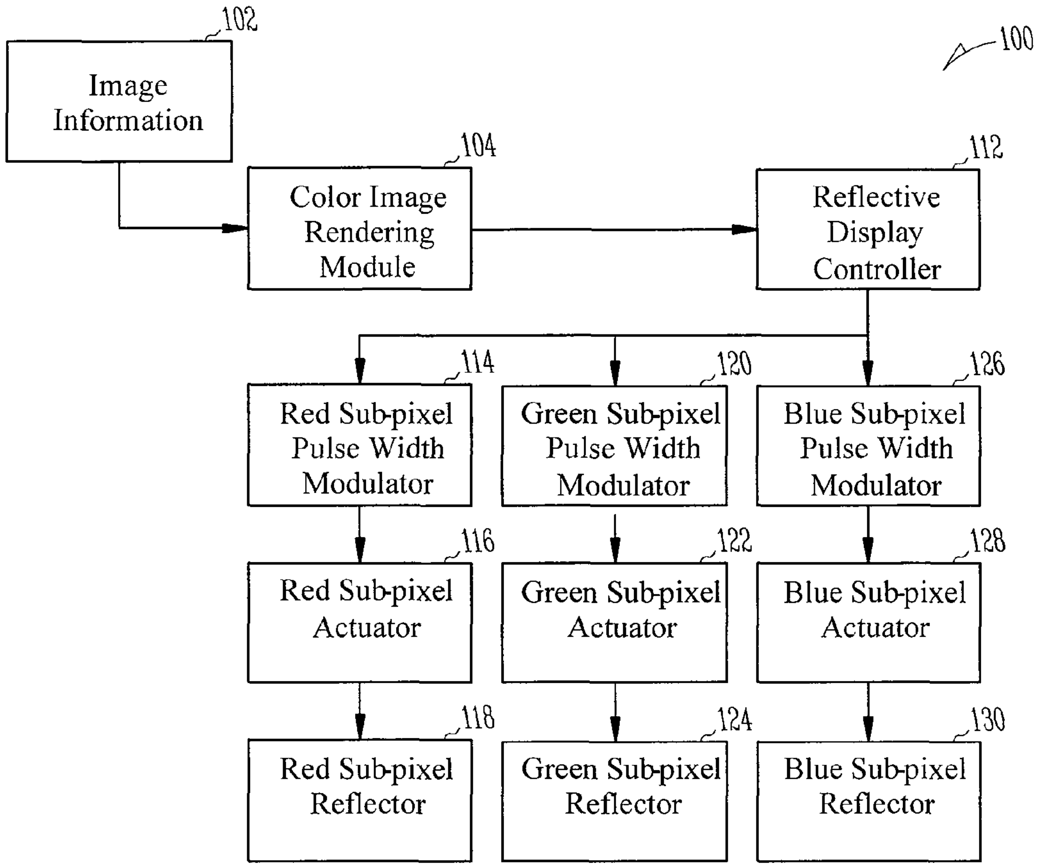
Fig.1 (Prior Art)
FIG. 1 is an illustration of a prior art reflective display device.

In the following description, numerous specific details are set forth in order to provide a thorough understanding of example embodiments. It is to be understood, however, that the various embodiments may be practiced without these specific details. For example, logical, electrical and structural changes may be made without departing from the spirit and scope of the present subject matter. The following detailed description is, therefore, not to be taken in a limiting sense, and the scope of embodiments is defined only by the appended claims.

Ambient light-compensated reflective display devices and methods related thereto are described. Embodiments described herein are directed to energy-efficient reflective display devices which are configured to retain a specified color balance, such as in non-ideal ambient lighting conditions and across changing ambient lighting conditions. This result may be accomplished by providing an ambient light detection and compensation device that detects and applies the appropriate color profile to compensate for non-ideal lighting conditions, thus providing the specified color balance.

A mobile device can use a variety of display technologies, such as a liquid crystal display (LCD). Some mobile devices use an LCD including a backlight or an active array of transistors (e.g., an active thin-film transistor matrix, or the like), or both, such as to control each pixel in the display. However, LCDs including a backlight or an active transistor matrix, or both, can have a very high power demand, thus shortening battery life of the mobile device.

One alternative to an LCD device is a reflective display device which uses ambient light as the light source to provide the display. For example, a reflective display can reflect a specified portion of incident light from an ambient light source back towards a user to provide a specified display image, either in addition to a backlight, or instead of a backlight. However, the quality or color accuracy of an image provided by a reflective display device lacking a backlight can be limited, such as by the type of ambient light. For example, if the incident ambient light has a deficiency in a certain portion the incident ambient light's spectrum, there may not be sufficient light available for reflection at the deficient frequency at a desired level of intensity or brightness. As a result, the reflective display device's performance will suffer, producing undesirable color changes or one or more other disruptions in the reflective display. For example, when a user takes a conventional reflective display device, such as a conventional mobile reflective display device, from one type of ambient lighting condition to another, such as from indoors to outdoors in the sunlight, an unwanted shift in color balance can occur. The result can include an image with an undesirable tint, such as a grey, grayish, yellow or yellowish color, or one or more other imperfections in the displayed image.

True or ideal white light (hereinafter "white" light) can be considered an apparently colorless light (e.g., daylight, halogen lights) as it contains all the wavelengths of the visible spectrum at equal intensity, e.g., a continuous spectrum that is level across the band of visible light. "White" light is often referred to as "ideal" light. While most light sources do not produce light of equal intensity at all frequencies, some broad-spectrum light sources provide significant energy across the visible light spectrum. Examples of broad-spectrum sources include sunlight, or very bright incandescent sources, such as a halogen light source. The emission spectrum of such sources, while non-ideal, can include energy across a broad range of frequencies which correspond to an emission spectrum from a black-body. Such sources can be characterized as having an equivalent "color temperature," i.e., a temperature corresponding to the surface of a black-body having a similar emission spectrum.

Color temperature is a quantitative measure. The higher the number in kelvins (K), the cooler or bluer the shade. For example, a "warm" or "soft" white light bulb typically has a color temperature of up to 2800K. Such light sources impart a more orange/red light on objects. A "bright" white light bulb, on the other hand, emits a more bluish color and has a color temperature of about 3600K to 4900 K. As noted above, halogen white bulbs impart a clear, white light with very little red or blue tones, similar to sunlight. A halogen light source has a color temperature in the range of about 2800K to 3500K.

Luminous efficacy of a light source is a ratio of the visible light energy emitted (i.e., luminous flux) to the total power input to the light source. For a human viewer, the maximum efficacy possible is 683 lm/W for monochromatic green light at 555 nanometers wavelength, such as determined by the peak sensitivity of a human eye. For white light, the maximum luminous efficacy is around 240 lumens per watt, but the exact value is not unique because the human eye can perceive many different mixtures of visible light as white.

Halogen light and sunlight can be types of ambient light sources. Other ambient light sources however, are known to deviate from black-body behavior. This is because they include less broad emission spectra, or spectra including one or more sharp peaks or troughs, or both, such as including one or more deficiencies in various ranges of the visible spectrum. Moreover, even a source with a relatively broad spectrum can still provide a "washed out" or yellowed-looking image on a reflective display device, such as when the light source is overly biased towards the red end of the spectrum (e.g., when the source has a color temperature significantly lower than halogen light or sunlight).

Examples of less ideal light sources include, but are not limited to, indoor lighting, including certain non-halogen incandescent lights and florescent lights, and the like, both of which can include, but are not limited to, "cool" light bulbs, "soft" light bulbs, and the like. When a reflective display device is operated using incident ambient light from a less ideal source, the color balance of the display on the reflective display device can be shifted as compared to operation with sunlight or halogen light, or one or more other more ideal sources. The present inventor has recognized that a shift in color balance can be undesirable.

FIG. 1 illustrates a prior art reflective display device 100. Image information 102 useful for creating a bitmap image is sent to a color image rendering module 104. The color image rendering module 104 creates matrices representing relative intensities of the red, green and blue pixels to create a color image. The matrices are forwarded to a reflective display controller 112, which translates pixel color component information into commands for actuating each of the red, green and blue sub-pixel reflector elements in the reflective display grid.

Specifically, the reflective display controller 112 sends commands to a red sub-pixel pulse width modulator (hereinafter "Red PWM") 114, which, in turn, sends a signal to a red sub-pixel actuator 116, which, in turn, provides the red sub-pixel to a red sub-pixel reflector 118. Similarly, the reflective display controller 112 sends commands to a green sub-pixel pulse width modulator (hereinafter "Green PWM") 120, which, in turn, sends a signal to a green sub-pixel actuator 122 which, in turn, provides the red sub-pixel to a red sub-pixel reflector 118. Likewise, the reflective display controller 112 sends commands to a blue sub-pixel pulse width modulator (hereinafter "Blue PWM") 126, which, in turn, sends a signal to a blue sub-pixel actuator 128 which, in turn, provides the blue sub-pixel to a blue sub-pixel reflector 130.

Since sub-pixel elements have only two states, namely, on and off, perceived color intensities in reflective displays can be controlled by pulse width modulation (PWM). PWM relies on the integration time of a human eye ($1/30^{th}$ of a second) to translate a shortened duration of full intensity into a reduced intensity level. For example, interferometric modulators modulate light within a cavity through the use of interference. Utilizing MEMs-based technology, sub-pixel activation occurs via MEMS deflection in a resonant cavity. See, for example, A. Londergan, et. al., *Advanced Processes for MEMS-based Displays*, Proceedings of the Asia Display 2007, SID, Volume 1, pp. 107-112 (hereinafter "Londergan"), which is incorporated by reference herein in its entirety. The type of technology described in Londergan, however, is limited to pretuned cavities comprising arrays of pixels pretuned to various wavelengths, such as red, green and blue wavelengths.

Figure 2:
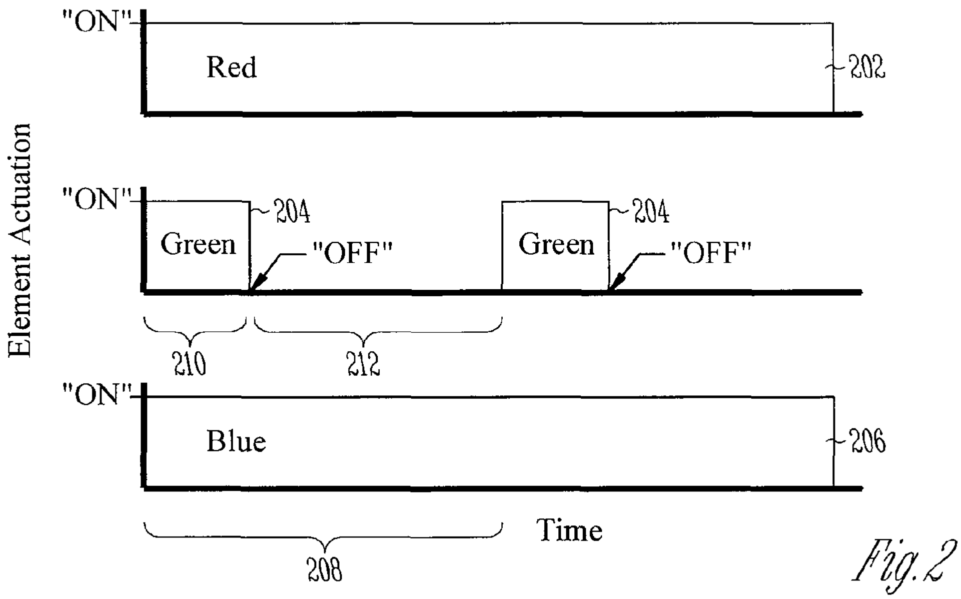
FIG. 2 is an illustration of the use of pulse width modulation (PWM) to produce an arbitrary color.

FIG. 2 illustrates the use of PWM to create a color which appears purple or purplish to the human eye by turning the green sub-pixel off earlier than the red and blue sub-pixels. This result is accomplished by turning at least one sub-pixel off and back on while the remaining sub-pixels remain on for a given period of time. In this embodiment, a red sub-pixel 202, a green sub-pixel 204 and a blue sub-pixel 206 are all activated at substantially the same time to an "ON" position. The red and blue sub-pixels, 202 and 206, respectively, remain on for approximately $2/30^{th}$ of a second. The green sub-pixel, however, is turned to an "OFF" position earlier, such as at about $1/90^{th}$ of a second, as shown in FIG. 2, turned back into the "ON" position at about $1/30^{th}$ of a second, and then turned to the "OFF" position at about $4/90^{th}$ of a second.

Therefore, even though the green sub-pixel 204 is on at full intensity, together with the red and blue sub-pixels, 202 and 206, respectively, to produce a white light during a first sub-integration time period 210 (~$1/90^{th}$ of a sec), and then turned off to create magenta light during a second sub-integration time period 212, the human eye will combine these two periods (210 and 212) an effective single integration time period 208 (e.g., corresponding to a display refresh rate). In the embodiment shown in FIG. 2, time period 208 is $1/30^{th}$ of a second. In other embodiments, time period 208 can be faster, such as $1/60^{th}$ or $1/75^{th}$ of a second, such as for interlaced displays. That is, if the on-off cycle of the sub-pixels is specified appropriately, a human can perceive a single, constant color, rather than rapidly alternating flashes of white and magenta colored light.

A three binary-sub-pixel display device can display eight different perceived colors selected from a list including black (all sub-pixels off), white (all sub-pixels on), red (red sub-pixel on), yellow (green and red sub-pixels on), magenta (red and blue sub-pixels on) and cyan (blue and green sub-pixels on) which correspond, to a display device having sub-pixels with only two states (on or off). At any given time, the display device is actually showing one of these eight colors. Any other color perceived by a human eye is a result of the brain being "tricked" into seeing a different color. Although embodiments described herein discuss red, green and blue sensors other combinations of color sensors is possible.

Figure 3:
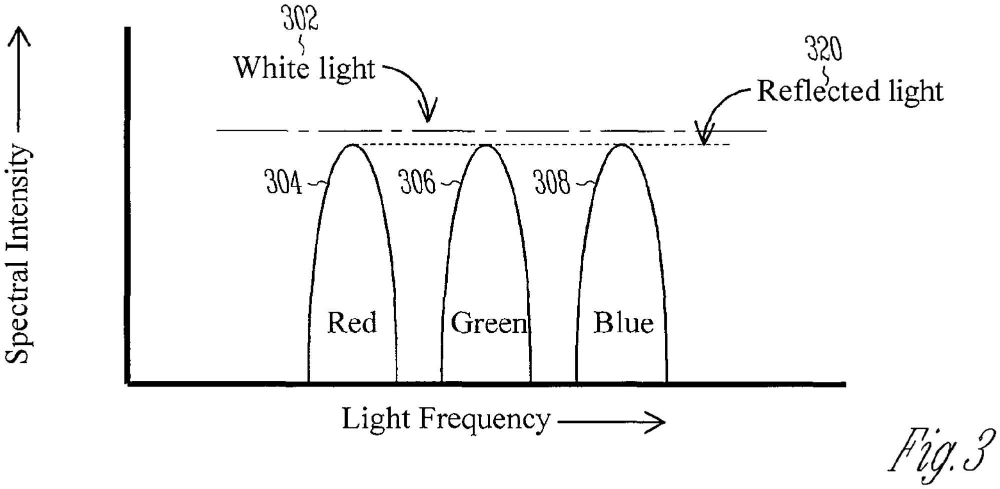
FIG. 3 is a graph illustrating reflective display performance under ideal lighting conditions with a reflected white light.

A human eye can perceive as few as three distinct colors as white, if they are of the proper intensity level and spectral placement, including, for example, at least one in each of the red, green, and blue light bands. More colors can be used, but only three are needed for human color perception. FIG. 3 illustrates how a pixel can be made to appear as white to the human eye when illuminated by white light 302. Therefore, perception of white light 302 is not entirely dependent on how bright the three colors are, but also on the relative brightness (spectral intensity) of the three colors.

In this illustration, three distinct light sources (of reflected light), namely red 304, green 306, and blue 308, have an equal amount of spectral intensity and are spaced apart in frequency. Such a configuration produces a reflected white light 320, thus producing what the human eye perceives as a white pixel. Different frequency spacing can be used, based on manufacturing concerns, to allow use of different relative intensities to create a reflected white light.

Figure 4:
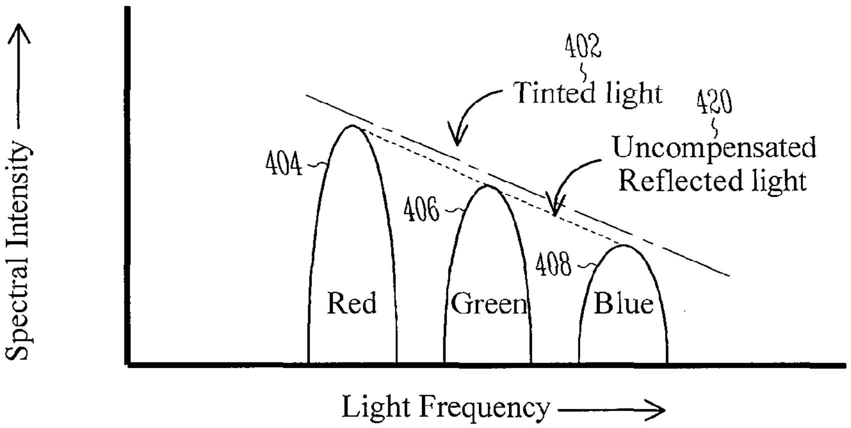
Fig. 4 (Prior Art)
FIG. 4 is a graph illustrating prior art reflective display performance under non-ideal lighting conditions.

FIG. 4 illustrates how a prior art pixel can appear orange to the human eye when illuminated by an off-white, e.g., tinted light, such as an orange light 402. Essentially, each sub-pixel is reflecting the incident light in the proportions necessary to produce white light. In this illustration, three distinct light sources (of reflected light), namely red 404, green 406, and blue 408, although spaced equally spaced across frequency, have decreasing levels of intensity, with the red light 404 having the greatest intensity, the green light 406 having a lower intensity and the blue light 408 having the least intensity. This configuration produces a reflected orange light 420, thus producing what the human eye perceives as an "orange" pixel. Such a result is not desirable when viewing reflective displays and remains a problem for existing devices. Other colors can also be distorted on conventional devices.

In contrast, embodiments described herein include ambient light-compensated reflected display devices and methods related thereto, including methods of sensing and compensating for a difference between the detected ambient light color composition and a specified color balance.

The term "color balance" generally refers to the relationship between relative intensities of colors included in an image, such as a first (e.g., uncompensated) image to be displayed on a mobile device using the novel reflective display device described herein. A specified color balance can be used to adjust the relative intensities of uncompensated color information, to provide, for example, a second (e.g., compensated) image wherein neutral portions (e.g., one or more white or gray areas of the image), are perceived as neutral to the viewer of the display (e.g., "white balancing" or "gray balancing.") In addition to, or instead of white balancing or gray balancing, using the specified color balance can eliminate an unwanted shift of one or more colors in the displayed image (e.g., using the specified color balance can include improving the color "accuracy" of the image). For example, using a specified color balance can include adjusting one or more relative intensities of one or more colors to more faithfully reproduce a desired color to be displayed, or to maintain "color constancy" or similarity of perceived color across different ambient lighting conditions.

Figure 5:
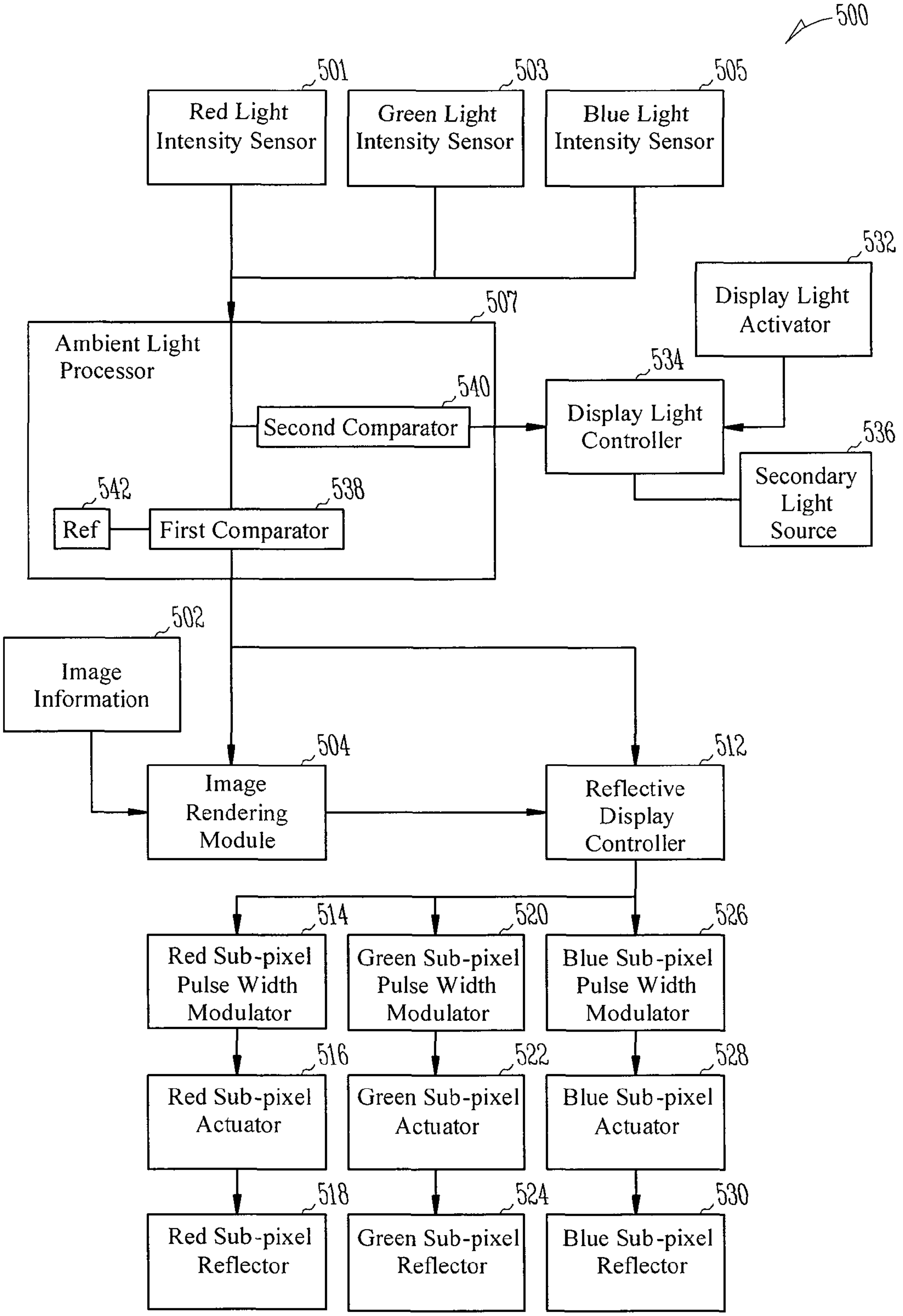
FIG. 5 is an illustration of a reflective display device according to an example embodiment.

In a reflective display device, such as the reflective display device of the example of FIG. 5, PWM can be used to display an image. Similar to the example of FIG. 1, a first (uncompensated) image can be processed, and corresponding pulse widths can be determined. But, in contrast to FIG. 1, in the example of FIG. 5, one or more pulse widths can be adjusted, such as using one or more weighting factors, to provide the second (e.g., compensated) image, such as using information about the ambient light, such as when the ambient light color composition includes a deficiency over one or more ranges of wavelengths.

In order to determine the desired weights, the novel reflective display devices are designed to be capable of sensing or estimating ambient color intensities at approximately the same ranges of frequencies (or wavelengths, as the frequency and wavelength of light are inversely related to one another) as used operationally by the sub-pixels. Then, a difference between the sensed or estimated ambient color intensities and a specified color balance can be determined. The specified color balance can be derived from a reference 542, such as corresponding to one or more of a perceptual model, a neural network, a fixed transformation matrix, or using one or more other techniques or methods. The resulting weights can then be used to provide a second image, such as to provide a hue closer to the intended hue contained in image information to be displayed, as compared to displaying the first image without using the weights. For example, the second image can be displayed at an intensity lower than the intensity of the first image.

In one embodiment, when ambient light enters a novel reflective display device with a color spectrum that is not evenly distributed across the visible light spectrum, one or more of the three color components, e.g., red, green or blue, can be adjusted (e.g., dimmed) to even out the reflected light to create the desired light, such as white light, to the human eye. For example, if an incandescent light source has too much red and green and not enough blue, such that it appears yellow to the human eye, shortening the pulse widths corresponding to the red and green color components can cause the red and green color elements to darken (thus, partially or fully blocking the intensity of those colors) until the output is again an approximately balanced white.

See, for example, FIG. 5, which illustrates a novel reflective display device 500 comprising sensors capable of detecting or sensing color components, e.g., red, green, and blue color components at or near the light frequencies at which the respective sub-pixels operate. In one embodiment, colors other than red, green and blue are detected, although it is expected that at least three colors are to be detected. Such colors may include, but are not limited to, cyan, magenta and yellow. Additionally, although three sensors are shown, more than three colors can be detected. In one embodiment, more than four colors are detected. In one embodiment, five to six colors are detected. However, at least three sensors are used, even if up to two of the sensors are providing a signal at minimal intensity. The sensors may be discrete components or embodied in a unified sensor array. The sensors may be, but do not necessarily have to be, deployed at substantially the same site on the mobile device.

In the embodiment shown in FIG. 5, color light sensors (red light intensity sensor 501, green light intensity sensor 503 and blue light intensity sensor 505) sense light and provide information to an ambient light processor 507 (hereinafter "ambient light compensation device"). The ambient light compensation device 507 provides information useful for compensating non-ideal ambient light conditions to the image rendering module 504. For example, the ambient light compensation device 507 can include a first comparator 538 configured to determine a difference between an ambient light color composition and a reference 542 (e.g., a specified color balance), using information about the ambient light provided by one or more of the red, green, or blue intensity sensors 501, 503, 505.

Image information 502, such as a raw color, gray-scaled or black-and-white image, can be stored in a memory of a mobile device, such as for displaying a bitmap image to a viewer. The image information 502 can be provided to the image rendering module 504, which can be used to process the raw image information 502 to provide a rendered image including information corresponding to respective color components, e.g., pixel-level information, to the image rendering module 504. In one embodiment, the image rendering module 504 can adjust the pixel-level information by weighting one or more color components of the pixel-level information using information provided by an ambient light processor 507. For example, the image information 502 can include the first (e.g., uncompensated) image as discussed above, and the image rendering module 504 can provide or store, or both, a second (e.g., compensated) image for display, using the weighting, such as to achieve a specified color balance when the second image is displayed.

In one embodiment, in order to create a color image, the image rendering module 504 provides matrices or other data structures representing modified or compensated relative intensities of the red, green and blue pixels received by their respective sensors. The matrices or other data structures are then forwarded to a reflective display controller 512, which translates pixel color component information into commands for actuating each of the red, green and blue sub-pixel reflector elements in the reflective display grid.

Specifically, the reflective display controller 512 sends commands to a Red PWM 514, which, in turn, sends a signal to a red sub-pixel actuator 516, which in turn provides the red sub-pixel to a red sub-pixel reflector 518. Similarly, the reflective display controller 512 sends commands to a Green PWM 520, which in turn sends a signal to a green sub-pixel actuator 522 which in turn provides the red sub-pixel to a red sub-pixel reflector 524. Likewise, the reflective display controller 512 sends commands to a Blue PWM 526, which in turn sends a signal to a blue sub-pixel actuator 528 which in turn provides the blue sub-pixel to a blue sub-pixel reflector 530. In one embodiment, the second image can be processed by the reflective display controller 512 to increase or decrease one or more pulse widths associated with one or more of the respective red, green, or blue sub-pixel pulse width modulators 514, 520, 526.

In addition to, or alternatively, when not all desired color components are included in the incident ambient light, or when the ambient light has insufficient intensity, a secondary light source may be used. In one embodiment, automatically or based on user input, a secondary display lighting system may be enabled, such as in response to user input (e.g., a user request to turn on the secondary display lighting system by pressing a button, touching a touch pad, tapping a key, selecting a menu item or using any other user interface). Referring again to FIG. 5, a display light activator 532 can be activated by the user, thus enabling a display light controller 534 to send a signal to a secondary light source 536 (e.g., a backlight), thus providing additional lighting to the display device. The display light activator 532 can include a button, a keypad, a touch pad, an option or menu item within a graphical user interface, etc.). In one embodiment, a second comparator 540 can be used to compare one or more sensed color components to an intensity threshold, such as to provide a comparator output signal to the display light controller 534, to automatically enable the secondary light source 536.

In another embodiment, there is no secondary light source 536, or there may be insufficient battery power to use a secondary light source 536, e.g., the secondary lighting system. In this embodiment, the rendering module 503 can change from displaying a color image to use of a grayscale image by converting the color image information 202 to a grayscale representation, rather than to a red-green-blue (RGB) or other color representation.

In another alternative embodiment, such as in low light level situations (e.g., darkness or near-darkness), the image rendering module 504 can convert the image to a reduced or single-bit color depth, such as for a monochromatic display mode (e.g., wherein a pixel is either turned on or off, but color information is not displayed). In one embodiment, one or more of the first comparator 538 or the second comparator 540 can be used to provide a signal to the rendering module to cause the rendering module to switch to a reduced color-depth, gray-scale, or single-bit color depth mode, such as in response to a detected ambient lighting condition as indicated by one or more of the first or second comparators 538, 540.

Figure 6:
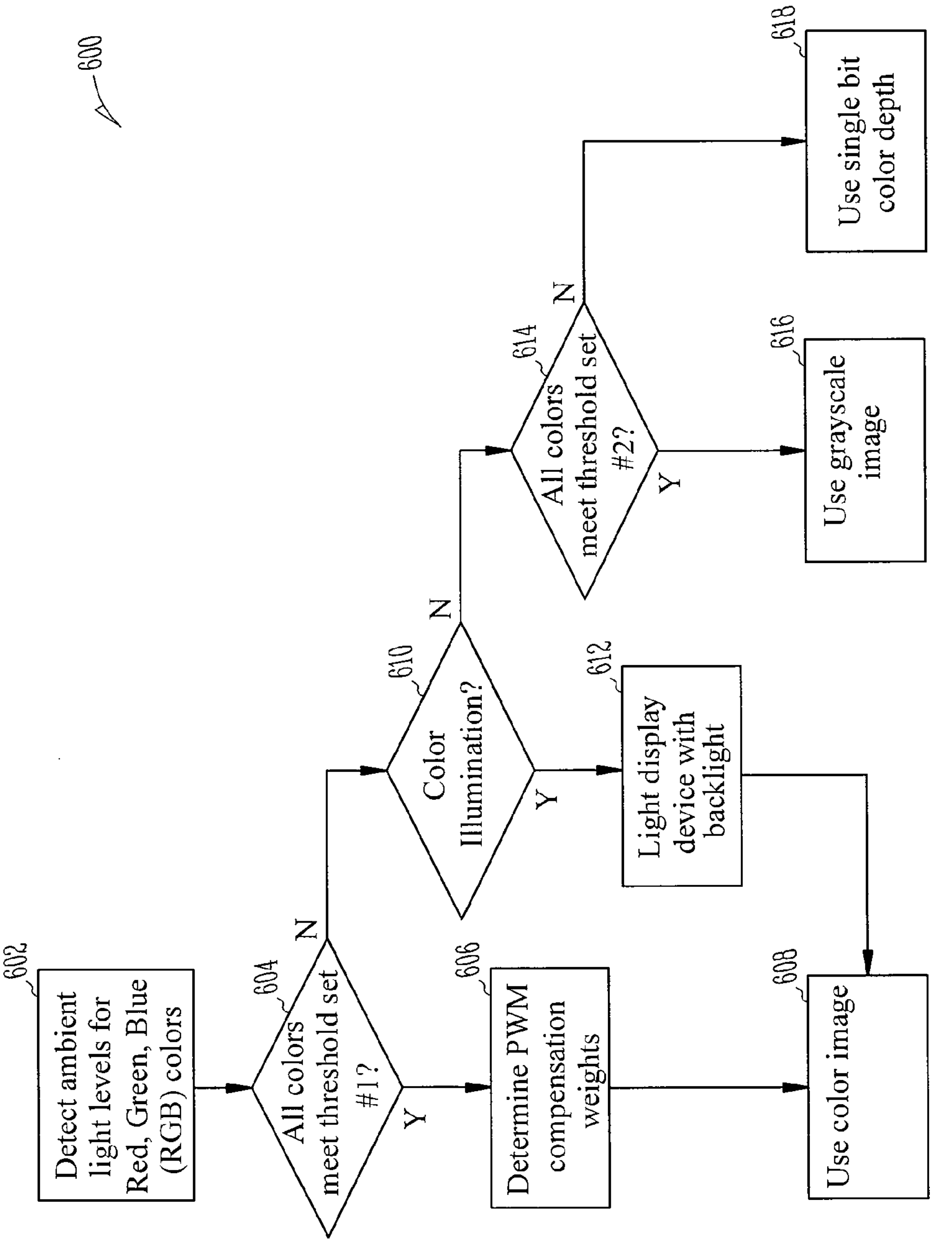
FIG. 6 is a block flow diagram of a method for detecting ambient light levels according to an example embodiment.

FIG. 6 illustrates one embodiment of a method of compensating for ambient light tint, such as for the illustration shown in FIG. 5. In this embodiment, ambient light levels are detected 602 for each the red, green, and blue color components, at or near the light frequencies at which the sub-pixels operate. At 604, a determination can be made as to whether color components sufficient to create a color image approximating the specified color balance are available, such as corresponding to first threshold intensity level, or one or more other thresholds. If so, appropriate PWM compensation weights, e.g., modified PWM compensation weights, are determined 606, and a color image may be used 608. In one embodiment, the PWM compensation weights include one or more of an offset (e.g., an increase or decrease in pulse width), a scaling factor, or one or more other functions or techniques to adjust the pulse width corresponding to one or more color components to be displayed. In one embodiment, a look-up table, a function, a piece-wise linear approximation, or one or more other transforms is used to provide adjustment to one or more pulse widths in manner taking into account the intensity of the initial uncompensated pulse width.

If the first threshold is not met, then a determination 610 as to whether or not color illumination is available is made. If so, the display device can be lit 612 with a secondary light source to provide additional lighting for the color image being used 608. In one embodiment, the additional lighting requires user input. If color illumination 610 is not available, such as when a battery is low in power or no illumination is present in the display device, a determination 614 can be made as to whether or not all colors meet a second threshold level is made. If so, grayscale components necessary to create a grayscale image can be used at 616. If not, a monochromatic image display mode or single-bit color depth 618 can be used. In this embodiment, each pixel is individually fully on to take advantage of all ambient light.

Figure 7:
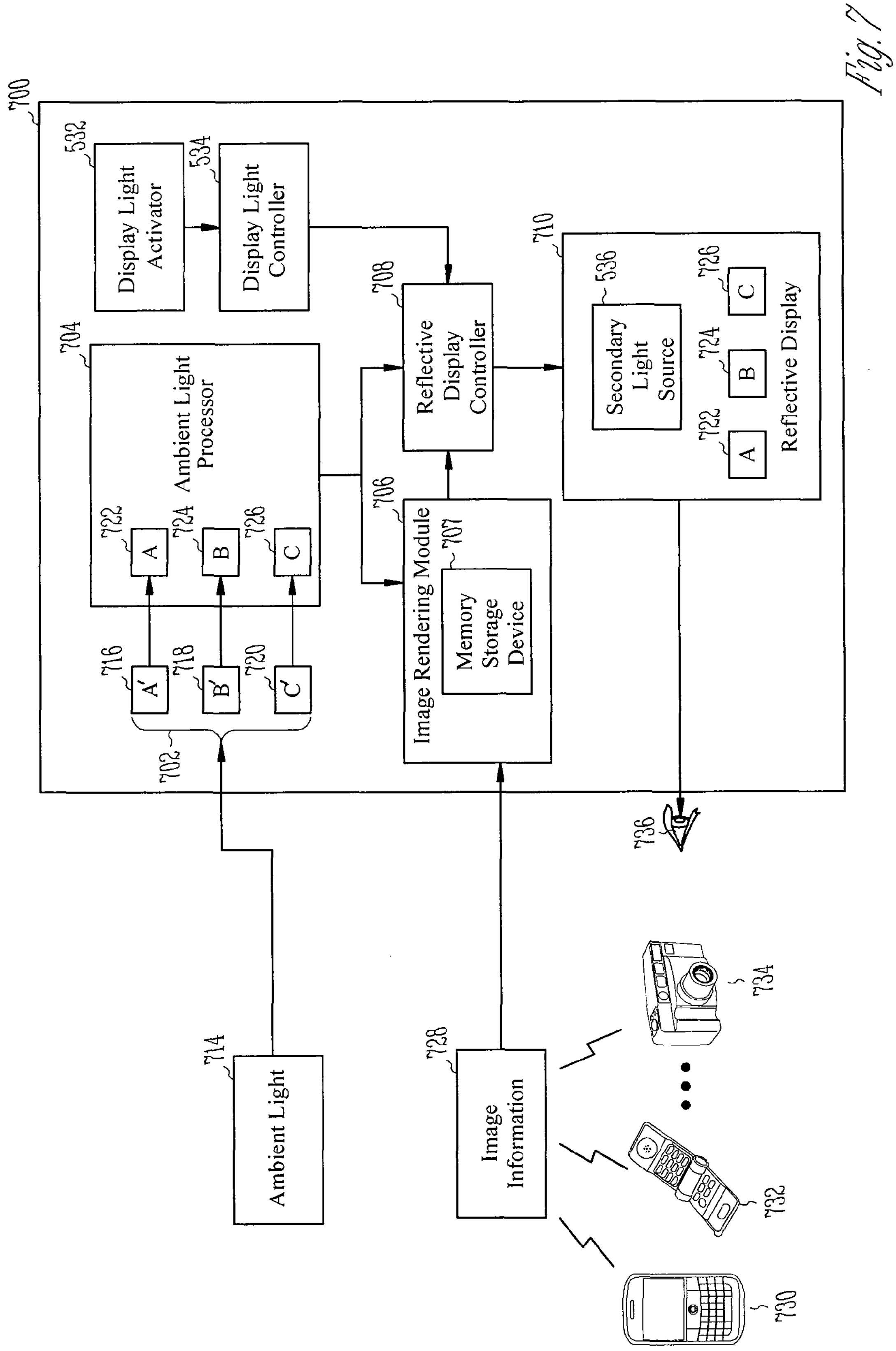
FIG. 7 is a block diagram of a reflective display device according to an example embodiment.

FIG. 7 illustrates an exemplary reflective display device 700 according to an example embodiment. The reflective display device 700 comprises color sensors 702, an ambient light compensation device 704, an image rendering module 706 containing a memory storage device 707, a reflective display controller 708, and a reflective display 710. Ambient light 714 is detected by the color sensors 702 as three separate colors, namely a first color "A'" (716), a second color "B'" (718) and a third color "C'" (720). The detected colors (716, 718 and 720) enter the ambient light compensation device 704 where they are compared with a reference color balance stored in the ambient light compensation device 704, which corresponds with a specified color balance.

In certain examples, the reference can include information about desired relative intensity levels of various color components of a light source, such as approximating a desired color balance corresponding to ambient light, including sunlight or a halogen light. In one embodiment, a compensated first color "A" (722), a compensated second color "B" (724), and a compensated third color "C" (726) is produced in response to the comparison between the detected colors (716, 718, and 720), and the reference or specified color balance.

In one embodiment, compensation information is provided to one or more of the image rendering module 706 or the reflective display controller 708, including, for example, one or more respective weighting coefficients corresponding to one or more respective color components included in the image information 728. The compensation can be applied non-equally to one or more respective color components, corresponding to one or more of the detected colors (716, 718 and 720) by increasing a weight of a first color component in relation to one or more others, or by decreasing the one or more others, while holding the first color component weight unchanged, such as to achieve a desired color balance.

The reflective display controller 708 also receives image information 728 from the image rendering module 706. In the embodiment shown in FIG. 7, the image information 728 can be derived from one or more sources, including from one or more of a memory, wireless information receiver, or image capture circuit, such as included as portion of a smart phone 730, a cell phone, or a digital camera 734, or the like. In other embodiments other types of mobile devices may be used, such as discussed below. The reflective display controller 708 translates pixel color component information received from the ambient light compensation device and the image rendering module 706 into commands for actuating color elements in the reflective display 710. In one embodiment, the reflective display controller 708 can optionally receive a signal from the display light controller 534, which receives a signal from the display light activator 532, as discussed in FIG. 5 above. The reflective display controller 708, in turn, can provide a signal to the secondary light source 536 contained within the reflective display 710.

In one embodiment, a human eye 736 perceives the balance of colors (e.g., A 722, B 724, and C 726) provided by the reflective display 710 as having substantially the same color balance as the specified color balance corresponding to the sensor compensated colors (A 722, B 724, and C 726), although at a lower intensity.

In one embodiment, the ambient light compensation device 704 includes an ambient light color composition detector, a comparison device capable of comparing the detected ambient light color composition (e.g., A', B' and C') with the color light sensors (A, B, and C), and a compensator device capable of substantially matching the image information 706 to the detected ambient light color composition (A', B' and C'). In one embodiment, the ambient light compensation device 704 comprises two or more devices.

The reflective display device, in some embodiments, can be a portion, part, or component of a broader system or assembly, including a camera device or any type of mobile wireless device, including, but not limited to, mobile telephones, portable computers, personal digital assistants (PDAs), "smart" phones, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. A personal computer (PC) herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers (PC)s. An example of a portable PC is a laptop computer or notebook computer that typically has a display screen, keyboard, underlying hardware and software, and a display pointing device that are all integrated in a housing that can easily be carried by an individual. Some PDAs may be viewed as a type of portable computer.

The reflective display device is capable of receiving image information to be displayed, such as a mobile code image. The mobile code image can be received in several ways, such as from a camera or via a web page, email, a picture-based message, or other electronic modes depending on the capabilities of the mobile electronic device. The mobile code image is received by an application executing on the mobile electronic device and resolved to obtain the dataset. The data from the dataset is then parsed or otherwise processed by the application to obtain the content and additional content identifier. The content item can then be presented along with a representation of the additional content item identifier. The representation of the additional content item identifier can be content-retrieved from a network location, such as a location in the database via a server identified by the additional content item identifier, a user interface control that can be selected by a user to trigger downloading of the additional content based on the additional content item identifier, or other representation. Although the dataset may include renderable content, such as an image, text, graphic, audio, or other content, embodiments described herein are generally pertinent to renderable visible content (e.g., image, text, graphic, and the like). The dataset can also include an identifier of additional content.

Figure 8:
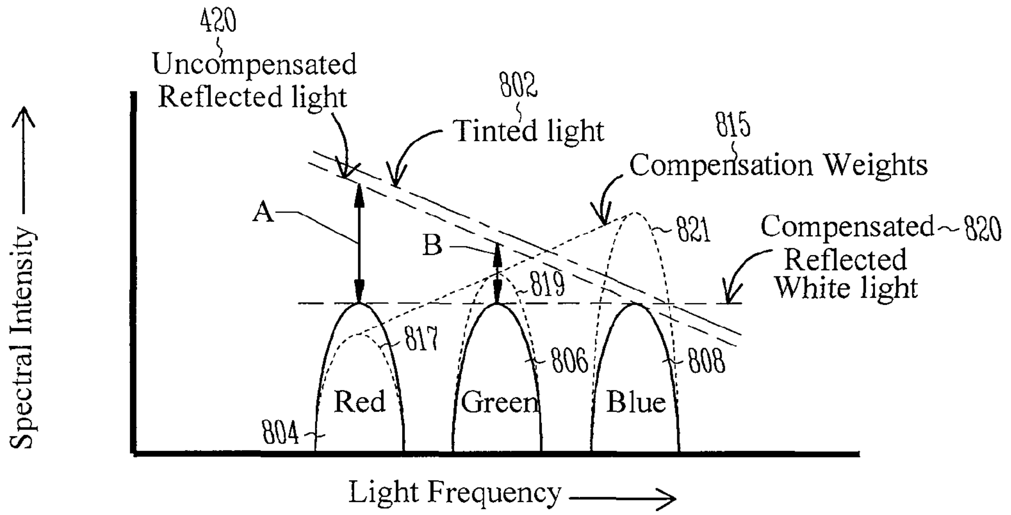
FIG. 8 is a graph illustrating compensated reflective display device performance under non-ideal lighting conditions with a reflected white light according to an example embodiment.
Figure 10:
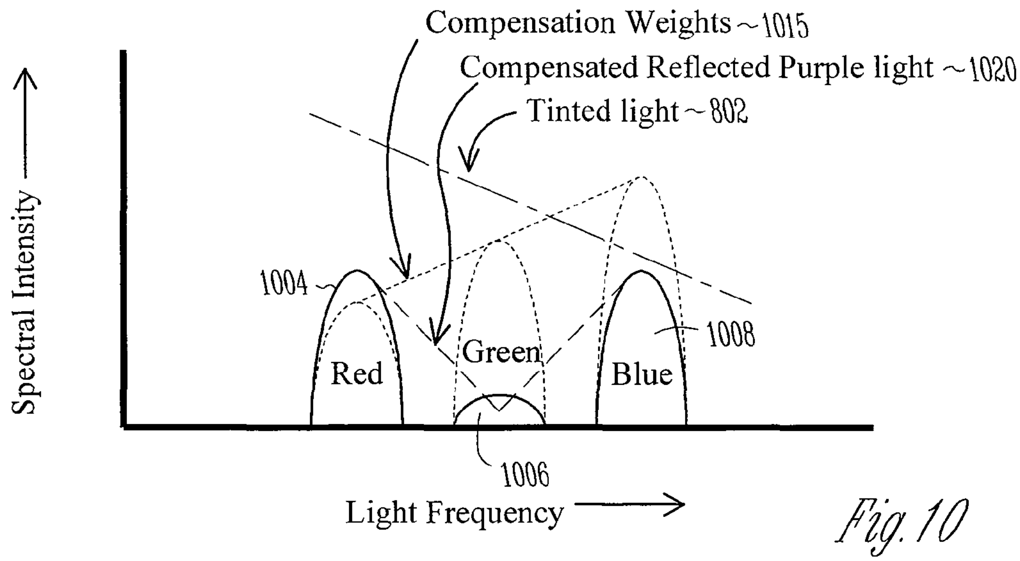
FIG. 10 is a graph illustrating compensated reflective display performance under non-ideal lighting conditions with a reflected purple light according to an example embodiment.

FIG. 8 illustrates an embodiment in which weights are used to adjust or determine the PWM durations during operation of the exemplary reflective display device 700, to provide a compensated image for display. For simplicity, a "white" pixel is illustrated, although a non-white pixel may also be used (FIG. 10). In this illustration, three distinct light sources, namely red 804, green 806, and blue 808, have, in contrast to the light sources in FIG. 4 (404, 406 and 408), are compensated with compensation weights 815 to produce a reflected white reflected light 820, thus "fooling" the eye into perceiving the incoming tinted light 802 as white in color, e.g., a "white" pixel.

In this embodiment, the reflected red intensity is compensated the most (Distance "A") as compared with the uncompensated reflected light 420 (from FIG. 4). The reflected green intensity is also reduced in comparison, but not as much (Distance "B"). The reflected blue intensity is not reduced at all, since that color component is the weakest in the ambient light.

By applying the appropriate compensation weights 815 for each light source in response to the specific tint or non-ideal ambient light the reflected display device is exposed to, the intensity of each light source is adjusted to produce the desired color fidelity. As FIG. 8 shows, the compensation weight for each sub-pixel is the inverse of the relative spectral intensity or strength of that color component in the ambient light. For example, compensation of the red light source 804 reduces its intensity as shown by dashed line 817, while compensation of the green light source 806 increases its intensity as shown by line 819, while compensation of the blue light source 708 increases its intensity more than the green light source, as shown by line 821.

Essentially, if a color is overrepresented in the ambient light, some of its reflective intensity is pulled out of the mix. In one embodiment, some of two or three colors can be pulled out at varying amounts. As a result, the compensated reflected light 820 or white pixel in the reflective display device is now substantially free of tint, although its intensity is reduced as compared to the intensity of an uncompensated pixel or a pixel reflecting ideal white light. This is because intensity is limited by the amount of blue light available for reflection. Different frequency spacing can be used as desired, to cause different relative intensities to be used in creating a reflected white light. The reflected light 820 has a more accurate hue as compared to a hue which would be viewed without pulling out any of the color, but, again, is darker or less intense, e.g., less "bright" to the human eye. As noted above, if the result is too dark such that the colors are too difficult to see, other options are possible, such as an additional backlight, a grayscale image, or by reducing the color depth of the image (e.g., displaying a monochromatic version of the image), or any combination thereof.

Figure 9:
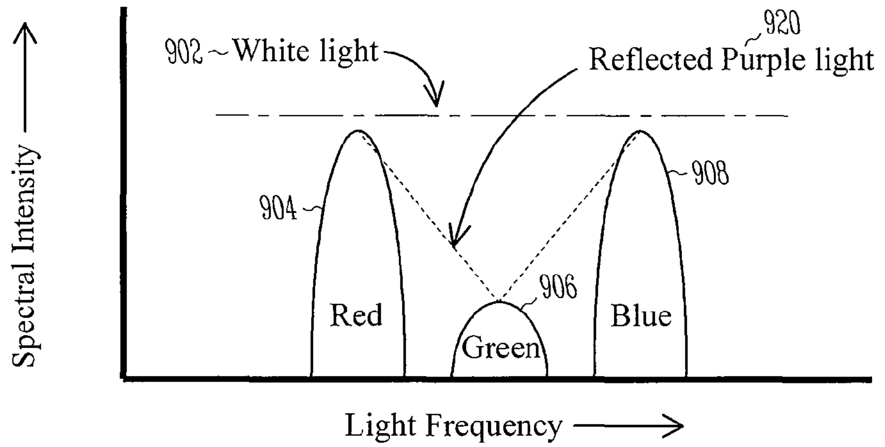
FIG. 9 is a graph illustrating reflective display device performance under ideal lighting conditions with a reflected purple light.

FIG. 9 illustrates an embodiment in which a pixel is made to appear purple to the human eye when illuminated by white light 902. In this illustration, two distinct light sources (of reflected light), namely red 904, and blue 906, have an equal amount of spectral intensity, while the green reflected light 908 has a reduced spectral intensity in comparison. Each of the light sources (904, 906 and 908) is equally spaced across frequency. Such a configuration produces a reflected purple light 920, thus producing what the human eye perceives as a purple pixel. Different frequency spacing can be used, based on manufacturing concerns, to allow use of different relative intensities to create a reflected purple light.

FIG. 10 illustrates an embodiment in which compensation weights are used to adjust or determine the PWM durations during operation of the exemplary reflective display device 700 under the tinted light 802 shown in FIG. 8, to provide a compensated image for display. In this illustration, three distinct light sources, namely red 1004, green 1006, and blue 1008, have been compensated to varying degrees with compensation weights 1015 to produce a reflected purple reflected light 1020, thus "fooling" the eye into perceiving the incoming tinted light 802 as purple in color, e.g., a purple pixel. The compensation weights 1015 can be used to increase, decrease, or scale the pulse widths corresponding to each respective sub-pixel element. In one embodiment, the compensation weights 1015 can be normalized, such as to scale the compensation coefficients such that none of the red 1004, green 1006, or blue 1008 sub-pixel intensities are required to be greater than the intensity of the corresponding incident light, since the reflected light intensity is always less than the incident light intensity (e.g., assuming no secondary light source such as a backlight). For example, in FIG. 10, the green sub-pixel starts with a lower desired intensity to produce a purple hue, and its intensity can be further reduced during compensation, such as by using the normalized compensation weight. In this example, the pulse width provided corresponding to the intensity of the green sub-pixel element in FIG. 10 can be further decreased, as compared to the green sub-pixel pulse width before weighting. The result is a color having approximately the same hue and saturation as that for FIG. 9, but at a lower intensity. As discussed in FIG. 8, different frequency spacing can be used as desired, to cause different relative intensities to be used to create a reflected white light.

In some embodiments, the compensation weights (e.g., after normalization or scaling) can so severely dim the resulting image that the resulting pixel luminosity is too low to be seen by the human eye or is otherwise interpreted as undesirably dark by the viewer. In such situations, as discussed in FIGS. 5 and 6, a secondary lighting system can be used. Otherwise, as lighting conditions worsen, the image can instead be converted to a grayscale image, tinted at the same hue of the ambient light. If this still does not produce the desired results or if the lighting conditions are so poor that such an option is not available, the image can instead be converted to a binary image, where each pixel is either fully on or fully off This conversion can include spatial mixing of white and black pixels to represent regions of gray, similar to the way newspapers use dot density to create differing shades of grays in images (e.g., using dithering, half-toning, or one or more other techniques to create perceived differences in tone using only single-bit or reduced color depth).

Figure 11:
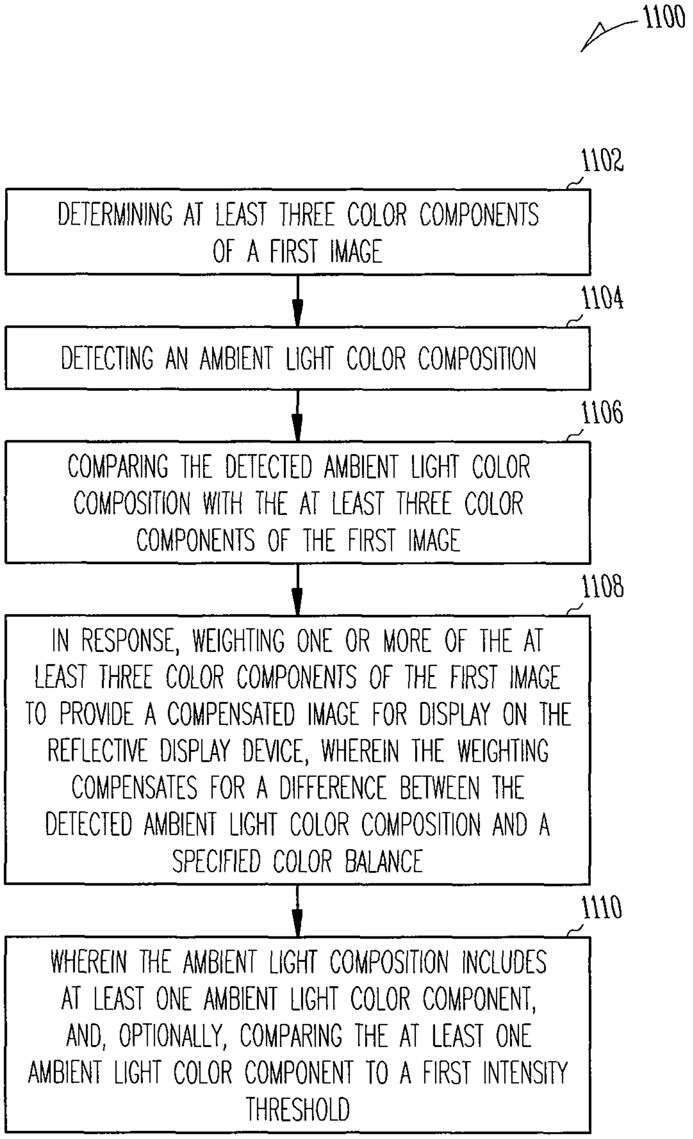
FIG. 11 is a block flow diagram of a method according to an example embodiment.

FIG. 11 is a block flow diagram of a method 1100 according to an example embodiment. The method 1000 is an example of a method that can be performed in whole, or in part, by a reflective device display. Such a reflective display device can include at least one processor, at least one memory device, a network interface device, and a user interface. The example method 1100 includes, at block 1102, determining at least three color components of a first image. In some embodiments, the first image is cached on a memory device of the computing device. The example method further includes, at block 1104, detecting an ambient light color composition, and, at block 1106 comparing the detected ambient light color composition with the at least three color components of the first image. The example method further includes at block 1108, in response, weighting one or more of the at least three color components of the first image to provide a second image to be displayed on the reflective display device, wherein the weighting compensates for a difference between the detected ambient light color composition and a specified color balance. The method can further optionally include at block 1110 wherein the ambient light composition includes at least one ambient light color component, and, optionally, comparing the at least one ambient light color component to a first intensity threshold.

In contrast to methods which utilize passive or pre-tuned (e.g. fixed) methods for compensation of less-than-ideal light, the use of an active compensation scheme in the novel embodiments described herein provide for active sensing under non-ideal ambient light conditions or in changing ambient light conditions. Such sensing includes, but is not limited to, modifying one or more pulse widths to be used to drive sub-pixel elements corresponding to one or more color components included in an image to be displayed. An ambient color composition, including an unwanted or undesirable tint, can now be detected or sensed, and compensation can be provided, such as by providing modified PWM parameters, thus allowing a desired specified color balance to be retained or restored under a wide range of ambient lighting conditions. In one embodiment, a desired specified color balance is retained, but at a lower brightness level as compared to the brightness of the incoming light and as compared to methods which can produce a brighter reflected light, but at the expense of color accuracy.

In contrast to conventional methods of color compensation, the novel ambient light compensation methods and devices described herein do not utilize any type of cover or skin, such as a translucent display cover, applied to an outside surface of the display.

Embodiments described herein provide, for the first time, the ability to provide continuous, real-time sensing of and adjustment to ambient lighting conditions using modified digital pulse width modulation (PWM), as opposed to passive, pre-selected corrections, predefined ambient light profiles, complex gap adjustments, such as analog gap adjustments, or corrections entirely dependent on user preference, input or both.

Additionally, the embodiments described herein do not rely solely on an artificial light source, although an additional light source can be activated under specified conditions, such as automatically or manually, as needed. Also, in contrast to devices which utilize a filter between such a light source and display, such as a reflective MEMs display, the ambient light compensated reflective devices described herein are not dependent on nor require any type of filter. The embodiments described herein further differ from complex mirror-type MEMS devices which utilize a mirror rather than a resonant cavity to deflect light onto a screen or an absorber by tilting the mirror. Although such devices use PWM to control the tilt of the mirror, they also require an artificial light source and provide no correction for ambient light temperature (white balance) problems.

Further, in contrast to conventional reflective display devices which are limited to providing a non-yellowish tint only in the presence of a "white" light source (e.g., halogen source), embodiments of the novel display devices described herein retain color fidelity throughout a wide range of ambient lighting conditions by actively sensing and compensating for tints in the surrounding ambient light. As a result, the novel display devices provide a highly flexible, real-time response to changing lighting conditions, such as when the display device is moved from an indoor to an outdoor location, or vice versa.

Method examples described herein can be machine or computer-implemented, at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like It will be readily understood to those skilled in the art that various other changes in the details, material, and arrangements of the parts and method stages which have been described and illustrated herein may be made without departing from the principles and scope of the inventive subject matter as expressed in the subjoined claims.

What is claimed is:

1. A method comprising:

determining at least three color components of a first image;

detecting an ambient light color composition;

comparing the detected ambient light color composition with the at least three color components of the first image;

in response, weighting one or more of the at least three color components of the first image to provide a compensated image for display on the reflective display device, wherein the weighting compensates for a difference between the detected ambient light color composition and a specified color balance; and enabling a secondary light source configured to provide light at least partially for use by the reflective display in displaying the compensated image.

2. The method of claim 1, wherein the determining at least three color components includes storing the first image in a memory without requiring the first image to be displayed on the reflective display.

3. The method of claim 1, wherein the specified color balance includes at least one of a specified gray balance or a specified white balance.

4. The method of claim 1, comprising determining at least three respective pulse widths to be used with at least three respective pulse width modulators, the at least three pulse width modulators corresponding to each of the at least three color components, and wherein the three respective pulse widths are adjusted using the weighting.

5. The method of claim 4, wherein the ambient light color composition includes a deficiency in a first range of wavelengths and the weighting includes increasing a weight of at least one color component corresponding to the deficiency in the first range of wavelengths, further wherein the determining the at least three respective pulse widths includes increasing a pulse width corresponding to the increased weight of the at least one color component.

6. The method of claim 4, wherein the ambient light color composition includes a deficiency in a range of wavelengths and the weighting includes decreasing a weight of at least one color component, further wherein the determining the at least three respective pulse widths includes decreasing a pulse width corresponding to the decreased weight of the at least one color component.

7. The method of claim 6, wherein the decreasing the weight of the at least one color component includes decreasing the weight of at least one color component included in a second range of wavelengths and the first and second ranges of wavelengths are largely non-overlapping.

8. The method of claim 1 further comprising displaying the compensated image on the reflective display device, wherein the at least three color components are selected from red, green, blue, yellow, magenta and cyan.

9. The method of claim 8, wherein the at least three color components are red, green and blue.

10. The method of claim 1, wherein the ambient light composition includes at least one ambient light color component and the method further comprises comparing the at least one ambient light color component to a first intensity threshold.

11. The method of claim 10, comprising, in response to the comparing, reducing a color depth of the compensated image when the at least one ambient light color component is below the first intensity threshold.

12. The method of claim 10, wherein the secondary light source is enabled in response to the comparing.

13. The method of claim 1, comprising receiving information from a display light activator corresponding to a user request to enable the secondary light source.

14. A reflective display device, comprising:

an ambient light processor configured to receive information about an ambient light color composition, the ambient light processor comprising a first comparator configured to determine a difference between the ambient light color composition and a specified color balance;

a reflective display controller configured to receive information about a first image and to determine at least three color components of the first image, wherein the reflective display controller is coupled to the ambient light processor and configured to weight one or more of the at least three color components to provide a compensated image for display on a reflective display using information about the difference from the comparator; and a display light controller configured to control a secondary light source, the secondary light source configured to provide light at least partially for use by the reflective display in displaying the compensated image.

15. The reflective display device of claim 14, comprising a memory configured to store the first image without requiring the first image to be displayed.

16. The reflective display device of claim 14, comprising a reflective display configured to display the compensated image.

17. The reflective display device of claim 14, wherein the specified color balance includes at least one of a specified gray balance, or a specified white balance.

18. The reflective display device of claim 14, comprising three respective pulse width modulators corresponding to each of the at least three color components of the first image; and wherein at least one pulse width modulator is configured to provide a pulse, the pulse including a specified pulse width to drive a sub-pixel element included in a reflective display, the specified pulse width determined using the weight of one or more of the at least three color components provided by the reflective display controller.

19. The reflective display device of claim 18, wherein the ambient light color composition includes a deficiency in a first range of wavelengths, further wherein the weight includes an increased weight of at least one color component corresponding to the deficiency in the first range of wavelengths, wherein the at least one pulse width modulator is configured to increase the specified pulse width in response to the increased weight.

20. The reflective display device of claim 18, wherein the ambient light color composition includes a deficiency in a first range of wavelengths, further wherein the weight includes a decreased weight of at least one color component, wherein the at least one pulse width modulator is configured to decrease the specified pulse width in response to the decreased weight.

21. The reflective display device of claim 20, wherein the decreasing the weight of the at least one color component includes decreasing the weight of at least one color component included in a second range of wavelengths and the first and second ranges of wavelengths are largely non-overlapping.

22. The reflective display device of claim 14, wherein the ambient light processor includes a second comparator configured to compare at least one color component included in the ambient light color composition to a first intensity threshold.

23. The reflective display device of claim 22, wherein the display light controller is coupled to the second comparator and configured to enable the secondary light source when the at least one color component is below the first intensity threshold as indicated by the second comparator.

24. The reflective display device of claim 22, wherein the reflective display controller is configured to reduce a color depth of the compensated image when the at least one color component is below the first intensity threshold as indicated by the second comparator.

25. The reflective display device of claim 14, comprising:

a display light activator configured to receive a user request to enable the secondary light source, wherein the display light controller is configured to enable the secondary light source in response to a request provided by the display light activator.

* * * * *